Oct. 3, 1967   J. A. CEROW, JR   3,344,683
ACTUATING MEANS ADAPTER FOR QUARTER-TURN VALVES
Filed Dec. 6, 1965

Inventor.
Joseph A. Cerow, Jr.
By Joseph O. Lange
Atty.

United States Patent Office 3,344,683
Patented Oct. 3, 1967

3,344,683
ACTUATING MEANS ADAPTER FOR QUARTER-TURN VALVES
Joseph A. Cerow, Jr., Chicago, Ill., assignor to Crane Co., Chicago, Ill., a corporation of Illinois
Filed Dec. 6, 1965, Ser. No. 511,647
4 Claims. (Cl. 74—526)

This invention relates generally to novel valve actuating means, and, more particularly, it is concerned with a detachable gear operating mechanism having suitable adapter means for effecting the convenient attachment of the said actuating means to a quarter-turn valve, such as a plug valve, a ball valve, or a butterfly valve, or in any other installation requiring a quarter-turn operator.

It has long been a problem in conveniently applying a portable operator, such as the kind shown in U.S. Patent No. 3,034,371, issued May 15, 1962, and in applying a construction covered in patent application Ser. No. 148,423, filed Oct. 30, 1961, now Patent No. 3,234,818, to quarter-turn valves of the general character described.

One of the principal difficulties encountered in the field is the fact that presently these quarter-turn valves do not lend themselves readily or conveniently to portable gear operators or to valve actuating mechanisms, such as the type known as the "Crane Teledyne" or "Converto-Gear," manufactured and sold by Crane Co., Chicago. In order to overcome this problem, it has been necessary to devise special adapters to receive the said mechanisms without employing special tools or equipment and without requiring skilled labor in the field.

It is, therefore, one of the principal objects of this invention to provide for a conveniently applied adapter which not only effects the quick and sturdy installation of the valve actuating mechanisms referred to, but at the same time, it provides the means by which the adapter serves as a gland nut or stuffing box packing retainer for the valves upon which the installation is made. As a matter of fact, at the time of installation of the adapters of this invention, suitable means are provided for also adjusting or renewing the packing in the stuffing box when the adapter is being applied.

Another important object is to provide for an adapter of the character described in which the quarter-turn rotation required of the valve is easily adjusted for any packing condition which might take place at the initial installation, such adjustment being done without bodily removing the adapter or displacing the actuating mechanism therefrom.

Another important object of this invention is to provide for an adapter in which the operation of the movable mechanism is easily or conveniently observed visually and at the same time permit of observing the position of the valve, that is whether it is open or closed.

Other objects and advantages will become more readily apparent upon proceeding with the following description read in light of the accompanying drawings, in which.

Similar reference numerals refer to similar parts throughout the several views.

Figure 1:
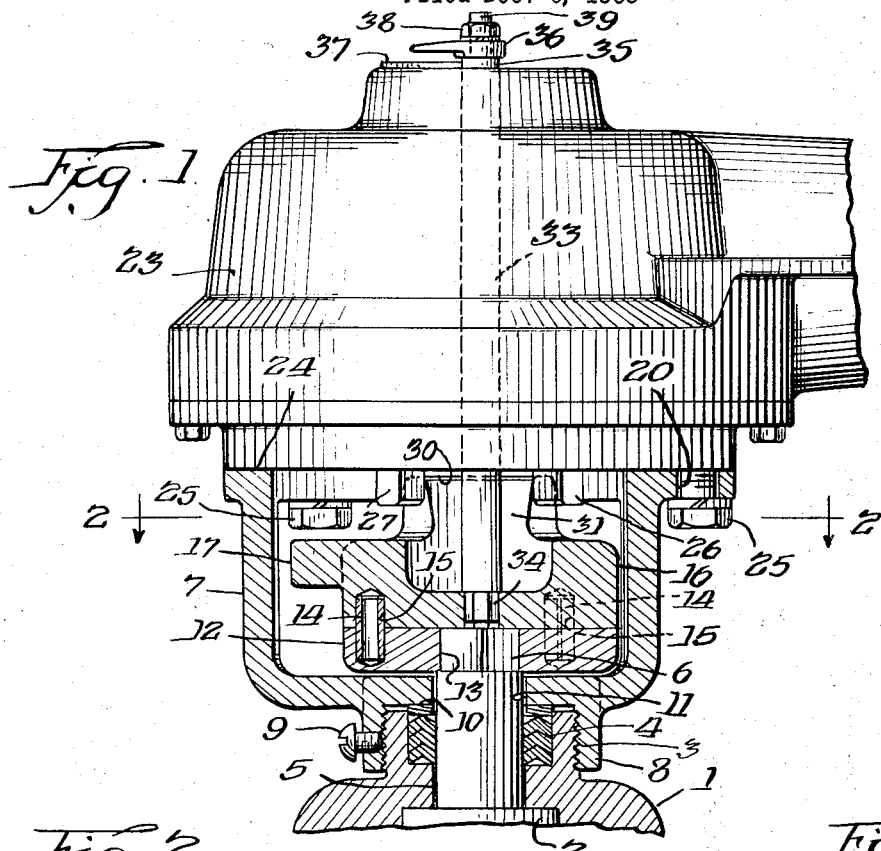
FIG. 1 is a fragmentary sectional assembly view showing the adapter of this invention applied to a quarter-turn valve and taken on the line 1—1 of FIG. 2.

Referring now to FIG. 1, the upper portion of a quarter-turn valve generally designated 1 is shown in fragmentary section having a closure member indicated, but not shown, connected to a shaft 2. Said closure member may be either a plug type, a ball valve, or a butterfly valve, the valve being indicated in a position in which the novel actuating mechanism to be described shows the valve in an open position. At the upper portion of the body of the valve 1, a conventional threaded shank designated 3 is illustrated normally providing for the reception of stuffing box packing 4 to encircle and seal the valve stem 5 in the usual manner. It might be explained that in a valve of this kind in which the conventional stuffing box is employed, a stuffing box nut or gland nut having its periphery defined by the dotted lines (FIG. 1) is normally employed and is therefore suitable for hand operation by means of a wrench normally applied to the square or other polygonal form 6.

In the instant construction, however, the said stuffing nut referred to is replaced by a novel form of adapter 7 forming the subject matter of this invention. Said adapter replaces the stuffing box nut and assumes the novel configuration shown having the integral depending hollow hub portion 8 threaded to receive the threads of the shank 3 and preferably being provided with a locking screw 9 for inhibiting rotation of the stuffing adapter member 7 when the desired rotative position of the adapter has been determined. Preferably, although not necessarily, a washer 10 overlies the stuffing box packing 4 as shown. The threaded shank member 8 is apertured as at 11 to receive the projecting portion 6 of the valve shaft 5. A shaft adapter plate 12 having the polygonal opening 13 snugly receives the square 6 of the said stem or shaft 5.

Figure 2:
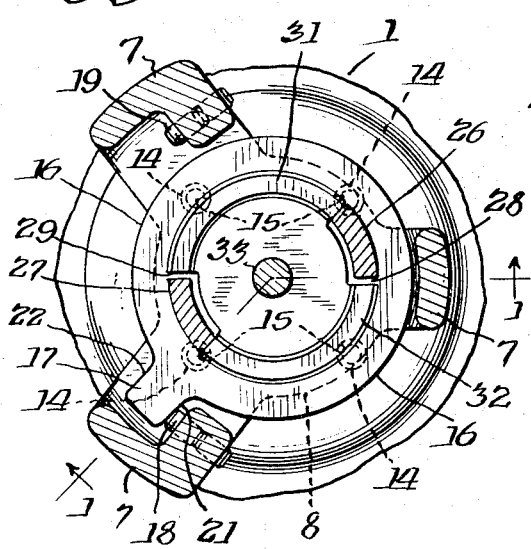
FIG. 2 is a fragmentary sectional assembly view taken on the line 2—2 of FIG. 1.
Figure 3:
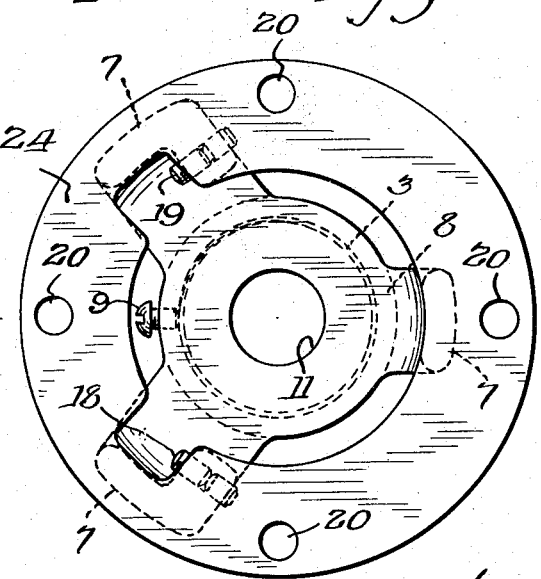
FIG. 3 is a plan view of the adapter assembled as shown in FIG. 1.

As shown more clearly in FIG. 2, the said plate 12 is provided with a plurality of spaced-apart annularly disposed pins 14. The driven stop member 16 is superposed upon the plate 12 and is mounted in non-rotatable relation thereto by virtue of the engagement of the pins 14 with suitable apertures 15 in the said plate. The said driven stop member is provided with the radially extending ear or lug 17 which upon rotation of said stop member 16 moves arcuately between the respective stop screws 18 and 19. Such movement occurs upon actuation of the said driven member 16 from the open position as indicated to the closed position, at which position said ear member will contact the stop screw 19. Thus in the open position of the valve, the ear member surface 21 is in contact with the adjusting screw as shown and in the valve closed position the surface 22 will then contact the adjusting screw 19.

The mechanism for driving the driven stop member 16 is preferably of the type the "Crane Teledyne" or the Crane "Converto-Gear" as referred to in said patent and patent application and therefore intentionally the detail description of these mechanisms is omitted. It might be explained that for receiving the said actuator mechanism generally designated 23, the stuffing box adapter 7 is provided with the upper flange surface 24 suitably bolted as at 20 by holes as at 20 by means of the cap screws 25 to the said actuating mechanism. Depending within the chamber of the stuffing box adapter 7 are clutch lugs 26 and 27, on the drive sleeve 30 of the said actuating mechanism with an end clearance preferably being provided as at 28 and 29 whereby a hammerblow may be imparted in either FIGS. 1 and 2.

It will, of course, be understood that the said adapter 7 may be made with a solid wall construction instead of having the openings as illustrated herein. Such modification is desirable for example in buried or submerged installations in order to protect the inner actuating mechanism against direct contact with the surrounding elements or weather conditions.

At the upper portion and extending through the housing 23, an extension stem 33 is non-rotatably attached as at 34 to the driven stop member 16. It projects through said housing as at 35 to receive the indicator pointer 36, the latter member being arranged to refer to the open and closed position symbols indicated at 37, preferably cast on the upper surface of the actuator housing 23. The indicator is attached by means of the nut 38 to the extension stem 33, engaging the threaded portion 39 thereof as illustrated.

In the operation of the device constituting this invention, it should now be clear that after the stuffing box 7 has been mounted on the threaded shank 3 of the casing 1 as shown in FIG. 1 the shaft adapter plate 12 is then positioned on stem polygonal portion 6 in superposed relation. Either the "Converto-Gear" or the "Crane Teledyne" unit is supplied as a complete manufactured assembly by Crane Co. and is installed upon the upper surface 24 of the adapter 7, it being rotated as it is placed on the plate so that the lugs 26 and 27 of the drive sleeve 30 are in proper rotative position for the engagement between portions 31 and 32 of the driven stop member 16. All that remains to be done is to attach the drive mechanism by means of the cap screws 25 and the valve is ready for operation in the field. Upon determining that the valve is properly positioned rotatively in relation to the actuating mechanism the lock screw 9 is firmly tightened in place.

It will be apparent that one of the advantages in this invention lies in the convenience and flexibility of installation in allowing the drive mechanism to be rotated in a plurality of directions depending upon space requirements and without impairing the operation of the valve stud.

Also, if adjustment is necessary in order to handle actuating projecting portions, such as the polygonal member 6 of the valve stem or shaft 5, it is relatively easy to supply a plate 12 having either greater or reduced thickness depending upon the installation requirements.

While only a single embodiment has been shown and described, it will be appreciated that this is for purpose of illustration only and not of limitation and that the scope of the invention should be measured by the appended claims.

I claim:

1. Valve actuating means in combination with a quarter turn valve having a limitedly rotatable axially immovable shaft and a closure member actuated by rotation of the shaft initially connected to a removable operator lever or the like, a valve casing having a stuffing box cooperating with said shaft, the said shaft having an end portion projecting from said stuffing box, the said casing having an upper threaded neck portion around the stuffing box for normally receiving a stuffing box packing nut, comprising a stuffing box adapter for said valve actuating means mounted on said upper threaded neck portion of valve casing having a depending hub portion cooperating with said upper threaded neck portion of the casing retaining the stuffing box packing and said stuffing box adapter in fixed relation to said casing, a shaft adapter plate mounted non-rotatably on said shaft projecting portion within said stuffing box adapter, said valve actuating means having a drive sleeve, a driven stop member supported on said shaft adapter plate having a lower portion operatively engaged by the said shaft adapter plate, a housing for the said drive sleeve, the said stuffing box adapter being axially aligned above the shaft adapter plate and driven stop member with the said drive sleeve, the stuffing box adapter having a mounting flange at an upper portion thereof effecting attachment of the said housing to the said stuffing box adapter, the said drive sleeve having clutch lugs engaging said driven stop member for rotating said shaft, stop lugs on said driven member and on said stuffing adapter for effecting limited rotation of said shaft and closure member.

2. The subject matter of claim 1, the said stuffing box adapter having spaced-apart supporting arms connecting the stuffing box portion thereof with said mounting flange, certain of said arms having said stop lugs for limiting said rotational movement of said shaft and closure member in cooperation with said driven member.

3. The subject matter of claim 1, an indicator shaft extending through said drive sleeve housing and connected non-rotatably to the said driven stop member.

4. The subject matter of claim 1, lock means for inhibiting predeterminately rotation of the said drive sleeve housing and said stuffing box adapter relative to the threads for the said stuffing box packing nut whereby to establish the desired rotational position of the said valve actuating means relative to the valve casing.

References Cited

UNITED STATES PATENTS

| 1,458,013 | 6/1923 | Tampier | 24—526 |
| 3,107,546 | 10/1963 | Rowland | 24—526 |

MILTON KAUFMAN, *Primary Examiner.*

UNITED STATES PATENT OFFICE
CERTIFICATE OF CORRECTION

Patent No. 3,344,683                 October 3, 1967

Joseph A. Cerow, Jr.

It is hereby certified that error appears in the above numbered patent requiring correction and that the said Letters Patent should read as corrected below.

Column 2, line 59, after "either" insert -- direction in opening or closing the valve. The lugs 26 and 27 thus are positioned between and engage the portions 31 and 32 of the driven stop member 16 as shown in --.

Signed and sealed this 8th day of October 1968.

(SEAL)
Attest:

Edward M. Fletcher, Jr.
Attesting Officer

EDWARD J. BRENNER
Commissioner of Patents